United States Patent

Tsutsui

(10) Patent No.: US 6,602,160 B2
(45) Date of Patent: Aug. 5, 2003

(54) DEVICE FOR HYDRAULICALLY CONTROLLING A CONTINUOUSLY VARIABLE TRANSMISSION

(75) Inventor: Teiji Tsutsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 43 days.

(21) Appl. No.: 09/733,901

(22) Filed: Dec. 12, 2000

(65) Prior Publication Data

US 2001/0049315 A1 Dec. 6, 2001

(30) Foreign Application Priority Data

Jun. 2, 2000 (JP) .................................... 2000-166144

(51) Int. Cl.⁷ .............................................. B60K 41/12
(52) U.S. Cl. .............................. 477/44; 477/50; 474/28
(58) Field of Search ......................... 477/44, 46, 50, 477/45; 474/12, 18, 28

(56) References Cited

U.S. PATENT DOCUMENTS 4,619,629 A * 10/1986 Shigematsu et al. .......... 474/18
4,682,518 A * 7/1987 Takada et al. ................. 74/867
4,718,306 A * 1/1988 Shigematsu et al. .......... 74/866
5,713,815 A * 2/1998 Funatsu et al. ............... 477/46

FOREIGN PATENT DOCUMENTS

| JP | 363062954 | * 3/1988 | .................. 474/22 |
| JP | 363067457 | * 3/1988 | .................. 474/19 |
| JP | 363101560 | * 5/1988 | .................. 474/18 |
| JP | 4-272569  | 9/1992   |                          |

* cited by examiner

Primary Examiner—Charles A. Marmor
Assistant Examiner—Tisha D. Lewis
(74) Attorney, Agent, or Firm—Sughrue Mion, PLLC

(57) ABSTRACT

A device for hydraulically controlling a continuously variable transmission by decreasing the load exerted on an engine to improve the fuel efficiency and preventing the slipping. The device includes a belt slip detector unit 27 which forms a slip detection signal DS when a slipping state of a V-belt is detected, and a belt slip suppressing unit 25, 26, SW1 which executes a correction processing for suppressing the slipping in response to the slip detection signal. The line pressure is set to a minimum required value until the slip is detected, and the correction processing is executed for suppressing the slip only when the slip is detected.

8 Claims, 7 Drawing Sheets

DEVICE FOR HYDRAULICALLY CONTROLLING A CONTINUOUSLY VARIABLE TRANSMISSION

BACKGROUND OF THE INVENTION

1. Field of the Invention

The present invention relates to a device for hydraulically controlling a continuously variable transmission having a V-belt by adjusting the widths of grooves of input and output pulleys depending upon the engine torque. More particularly, the invention relates to a device for hydraulically controlling a continuously variable transmission, which improves fuel efficiency, automatically detects the slipping state of the V-belt and suppresses the slip.

2. Prior Art

There has heretofore been known a continuously variable transmission which variably sets a transmission gear ratio between the input and the output by stretching a V-belt between a pair of pulleys and adjusting the widths of grooves of the pulleys round which the V-belt is wrapped.

In the continuously variable transmission of this kind as disclosed in, for example, Japanese Unexamined Patent Publication (Kokai) Nos. 42147/1988 and 272569/1992, movable conical plates provided for the pulleys are displaced by a hydraulic mechanism to vary the tension of the V-belt and the widths of grooves of the pulleys.

FIG. 7 is a diagram schematically illustrating the constitution of a general device for hydraulically controlling a V-belt type continuously variable transmission.

In FIG. 7, though widely known constitutional portions are not diagramed, an engine is equipped with an ignition device, and an intake pipe of the engine is equipped with a throttle valve and fuel injection valves.

The engine 1 and various actuators are equipped with various sensors (not shown) for detecting the operation conditions. Signals of various sensors are input to a controller 20 constituted by an ECU (electronic control unit).

A torque converter 3 having a damper clutch 2 is connected to the output side of the engine 1, and a back-and-forth change-over clutch is connected to the output side of the torque converter 3.

A CVT (continuously variable transmission) 5 is connected to the output side of the back-and-forth change-over clutch 4, and tires 7 of an automobile are connected to the output side of the CVT 5 via a differential gear 6.

The CVT 5 includes a first pulley 5a on the input side, a second pulley 5b on the output side, a V-belt 5c wrapped round between the first pulley 5a and the second pulley 5b, and hydraulic chambers 51 and 52 for adjusting the positions of the first pulley 5a and the second pulley 5b in the directions of arrows.

An oil pump 8 coupled to the engine 1 supplies an oil to the lubrication system of the engine 1 as well as to the hydraulic chambers 51 and 52 in the CVT 5 to adjust the CVT 5.

A conduit communicated with the oil pump 8 is provided with a flow rate control valve 9 for controlling a first hydraulic pressure (primary pressure) supplied to the hydraulic chamber 51 and a pressure control valve 10 for controlling a secondary hydraulic pressure (line pressure) supplied to the hydraulic chamber 52.

A conduit communicated with the hydraulic chamber 51 in the CVT 5 is provided with a primary pressure sensor 11 for detecting the primary pressure P1, a conduit communicated with the hydraulic chamber 52 in the CVT 5 is provided with a line pressure sensor 12 for detecting the line pressure P2, and the detected pressures P1 and P2 are input to the controller 20 like other various sensor signals.

The damper clutch 2 is provided with a direct-coupling duty solenoid 13, and the back-and-forth change-over clutch 4 is provided with a clutch duty solenoid 14.

Further, the flow rate control valve 9 is provided with a speed-change duty solenoid 15, and the pressure control valve 10 is provided with a line-pressure duty solenoid 16.

The duty solenoids 13 to 16 drive the damper clutch 2, back-and-forth change-over clutch 4, flow rate control valve 9 and pressure control valve 10 depending upon the control quantities from the controller 20.

In controlling the CVT 5, for example, the speed-change duty solenoid 15 drives the flow rate control valve 9 depending upon the primary pressure control amount C1 (hereinafter simply referred to as "control amount"), and the line-pressure duty solenoid 16 drives the pressure control valve 10 depending upon the line pressure control amount C2 (hereinafter simply referred to as "control amount").

The shafts on the output side of the engine 1 is provided with first to third rotation sensors 17 to 19 for detecting the first to third rotational speeds N1 to N3. The detected rotational speeds N1 to N3 are input to the controller 20 like other various sensor signals.

The first rotation sensor 17 is provided between the torque converter 3 and the back-and-forth changeover clutch 4, the second rotation sensor 18 is provided between the back-and-forth change-over clutch 4 and the CVT 5, and the third rotation sensor 19 is provided between the CVT 5 and the differential gear 6.

Here, the second and third rotational speeds N2 and N3 stand for an input rotational speed and an output rotational speed of the CVT 5.

The controller 20 controls the primary pressure P1 and the line pressure P2 (first and second hydraulic pressures) based upon the operation conditions of the engine 1, input and output rotational speeds N2 and N3 of the CVT 5, and detected values of the primary pressure P1 and the line pressure P2 (first and second real hydraulic pressures).

In FIG. 7, the driving force produced by the engine 1 is, first, transmitted to the CVT 5 via the torque converter 3 and the back-and-forth change-over clutch 4.

At this moment, the back-and-forth change-over clutch 4 is changed over to forward, neutral or reverse by the clutch duty solenoid 14.

The CVT 5 controls the transmission gear ratio relying upon the first pulley 5a, second pulley 5b and belt 5c, and transmits the output torque from the second pulley 5b to the tires 7 through the differential gear 6.

The hydraulic pressure produced by the oil pump 8 is adjusted by the pressure control valve 10 and is supplied, as the line pressure P2, to the hydraulic chamber 52 of the second pulley 5b.

Here, the pressure control valve 10 is controlled by the line-pressure duty solenoid 16 that is driven depending upon the control amount C2.

Further, the line pressure P2 adjusted by the pressure control valve 10 is divided by the flow rate control valve 9 and is supplied, as the primary pressure P1, to the hydraulic chamber 51 of the first pulley 5a.

At this moment, the flow rate control valve 9 is controlled by the speed-change duty solenoid 15 that is driven depending upon the control amount C1.

Thus, the primary pressure P1 and the line pressure P2 are adjusted to adjust the positions of the pulleys 5a and 5b, and the transmission gear ratio is set to a target value by the tension of the V-belt 5c and the CVT 5.

FIG. 8 is a functional block diagram illustrating the constitution of the controller 20 in a conventional device for hydraulically controlling a continuously variable transmission, and shows an operation unit for determining a control amount C2 for the line-pressure duty solenoid.

The controller 20 includes a CVT input torque detector unit 21 for detecting the torque Ti input to the CVT 5, a CVT transmission-gear-ratio detector unit 22 for detecting the transmission gear ratio GR of the CVT 5, a target line pressure operation unit 23 for operating a target line pressure Po2, and a PID operation unit 24 for operating the control amount C2 of the line-pressure duty solenoid 16.

The CVT transmission-gear-ratio detector unit 22 operates the real transmission gear ratio GR based on the second rotational speed N2 (input rotational speed of the CVT 5) detected by the second rotation sensor 18 and the third rotational speed N3 (output rotational speed of the CVT 5) detected by the third rotation sensor 19.

The target line pressure operation unit 23 operates a target line pressure Po2 based on the torque Ti input to the CVT 5 and the transmission gear ratio GR.

The target line pressure Po2 corresponds to a hydraulic pressure (second hydraulic pressure) necessary for reliably clamping the V-belt 5c to the first and second pulleys 5a and 5b.

The PID operation unit 24 operates, as the control amount C2, a PID correction quantity which is based on a line pressure difference $\Delta P2$ (=Po2−P2) between the target line pressure Po2 and the real line pressure P2 detected by the line pressure sensor 12.

That is, the PID operation unit 24 executes the PID control operation so that the real line pressure P2 is brought into agreement with the target line pressure Po2 based upon the data (input torque Ti and transmission gear ratio GR) of the CVT 5 to determine the control amount C2 of the line-pressure duty solenoid 16.

In the conventional device for hydraulically controlling the continuously variable transmission constituted as shown in FIGS. 7 and 8, when it is attempted to maintain a response of hydraulic pressure for the control quantities C1, C2 of the duty solenoids 15, 16 and to prevent slip of the V-belt 5c under every condition inclusive of after the aging, then, it becomes necessary to set a target line pressure Po2 which includes an excess of margin for the hydraulic pressure that is really necessary.

On the other hand, when the hydraulic margin is set to be small from the standpoint of improving fuel efficiency, then, the V-belt 5c may undergo the slipping due to the lack of line pressure P2 in case the control system of the line pressure P2 becomes no longer capable of following the change such as change in the vehicle state that occurs when the torque Ti input to the CVT 5 sharply increases.

Further, when an excessively large target line pressure Po2 is set to prevent the V-belt 5c from slipping, then, the oil pump 8 could become a large load to the engine to maintain a high line pressure P2 at all times, deteriorating the fuel efficiency.

According to the conventional device for hydraulically controlling the continuously variable transmission in which the line pressure P2 is maintained to be higher than the required pressure at all times, as described above, the line pressure P2 becomes insufficient in case the control system of the line pressure P2 becomes no longer capable of following the change, resulting in the slipping of the V-belt 5c. Besides, the oil pump 8 could become a large load upon the engine to deteriorate the fuel efficiency.

SUMMARY OF THE INVENTION

The present invention was accomplished in order to solve the above-mentioned problem, and its object is to provide a device for hydraulically controlling a continuously variable transmission which sets the line pressure to a minimum required pressure until the slip of a V-belt in the CVT is detected to lower the engine load and, hence, to improve the fuel efficiency and which, when the slip of the V-belt is detected, executes a correction processing for suppressing the slip to prevent the slip.

A device for hydraulically controlling a continuously variable transmission of the present invention comprises:

a continuously variable transmission of the V-belt type connected to the output side of an engine;

rotation sensors for detecting the input and output rotational speeds of the continuously variable transmission;

hydraulic pressure sensors for detecting first and second real hydraulic pressures for the first and second pulleys in the continuously variable transmission; and a controller for controlling hydraulic pressures for said first and second pulleys based upon the operation conditions of said engine, upon the input and output rotational speeds of said continuously variable transmission, and upon said first and second real hydraulic pressures; wherein the controller includes:

a belt slip detector unit which forms a slip detection signal when a slipping state of the V-belt is detected; and a belt slip suppressing unit which executes a correction processing for suppressing the slip of the V-belt in response to the slip detection signal.

In the device for hydraulically controlling a continuously variable transmission of the invention, the controller includes:

a real transmission gear ratio operation unit for operating a real transmission gear ratio of the continuously variable transmission based upon the input and output rotational speeds; and a virtual transmission gear ratio operation unit for operating a virtual transmission gear ratio of the continuously variable transmission based upon the real transmission gear ratio;

wherein the belt slip detector unit forms the slip detection signal based upon the comparison of the real transmission gear ratio with the virtual transmission gear ratio.

In the device for hydraulically controlling a continuously variable transmission of the invention, the belt slip detector unit forms the slip detection signal when a difference in the transmission gear ratio between the real transmission gear ratio and the virtual transmission gear ratio, becomes larger than a second predetermined amount in the direction of a second polarity opposite to the direction of a first polarity within a predetermined period of time from a moment when it became larger than a first predetermined amount in the direction of the first polarity.

In the device for hydraulically controlling a continuously variable transmission of the invention, the first and second predetermined amounts are set to be larger than a difference in the transmission gear ratio that occurs when normally changing the speed, and said predetermined period of time is set to be shorter than a time of from when a difference in the transmission gear ratio becomes larger than said first predetermined amount while normally changing the speed until when a difference in the transmission gear ratio becomes larger than said second predetermined amount.

In the device for hydraulically controlling a continuously variable transmission of the invention, the virtual transmission gear ratio operation unit operates the virtual transmission gear ratio by subjecting the real transmission gear ratio to the primary delay filtering, and a filter constant used in the primary delay processing is set to a value that does not change following the change in the real transmission gear ratio when the slip has occurred.

In the device for hydraulically controlling a continuously variable transmission of the invention, the controller includes a target line pressure operation unit that operates, as a target line pressure, the second hydraulic pressure necessary for clamping the V-belt to the first and second pulleys, and the belt slip detector unit validates the processing for detecting the slipping state when a difference in the line pressure between the target line pressure and the second real hydraulic pressure is greater than a predetermined amount.

In the device for hydraulically controlling a continuously variable transmission of the invention, the controller includes a target primary pressure operation unit for operating, as a target primary pressure, the first hydraulic pressure necessary for clamping the V-belt to the first and second pulleys, and the belt slip detector unit validates the processing for detecting the slipping state when a difference in the line pressure between the target line pressure and the first real hydraulic pressure is greater than a predetermined amount.

In the device for hydraulically controlling a continuously variable transmission of the invention, the belt slip suppressing unit adds a predetermined correction amount to the target line pressure in response to the slip detection signal.

In the device for hydraulically controlling a continuously variable transmission of the invention, the belt slip suppressing unit increases the correction amount by a predetermined amount every time when the slip detection signal is formed repetitively.

In the device for hydraulically controlling a continuously variable transmission of the invention, the controller includes an output torque control unit for controlling the output torque of the engine, and the belt slip suppressing unit decreases the output torque of the engine in response to the slip detection signal.

DESCRIPTION OF THE PREFERRED EMBODIMENTS

Embodiment 1.

An embodiment 1 of the present invention will now be described in detail with reference to the drawings.

Figure 1:
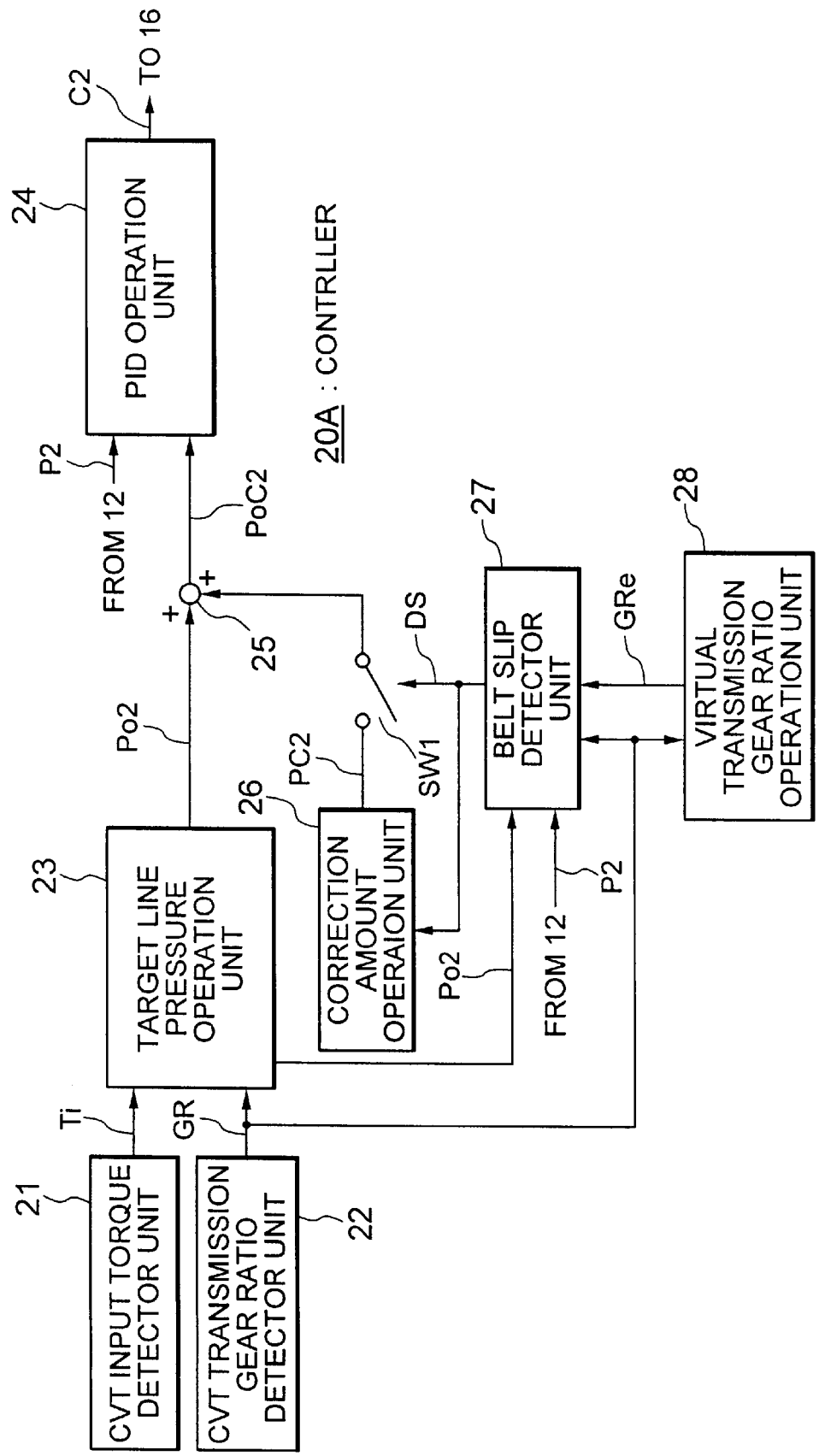
FIG. 1 is a functional block diagram illustrating major portions according to an embodiment 1 of the present invention.

FIG. 1 is a functional block diagram illustrating the embodiment 1 of the present invention, and shows an operation unit for determining a control amount C2 for the line-pressure duty solenoid 16.

Figure 2:
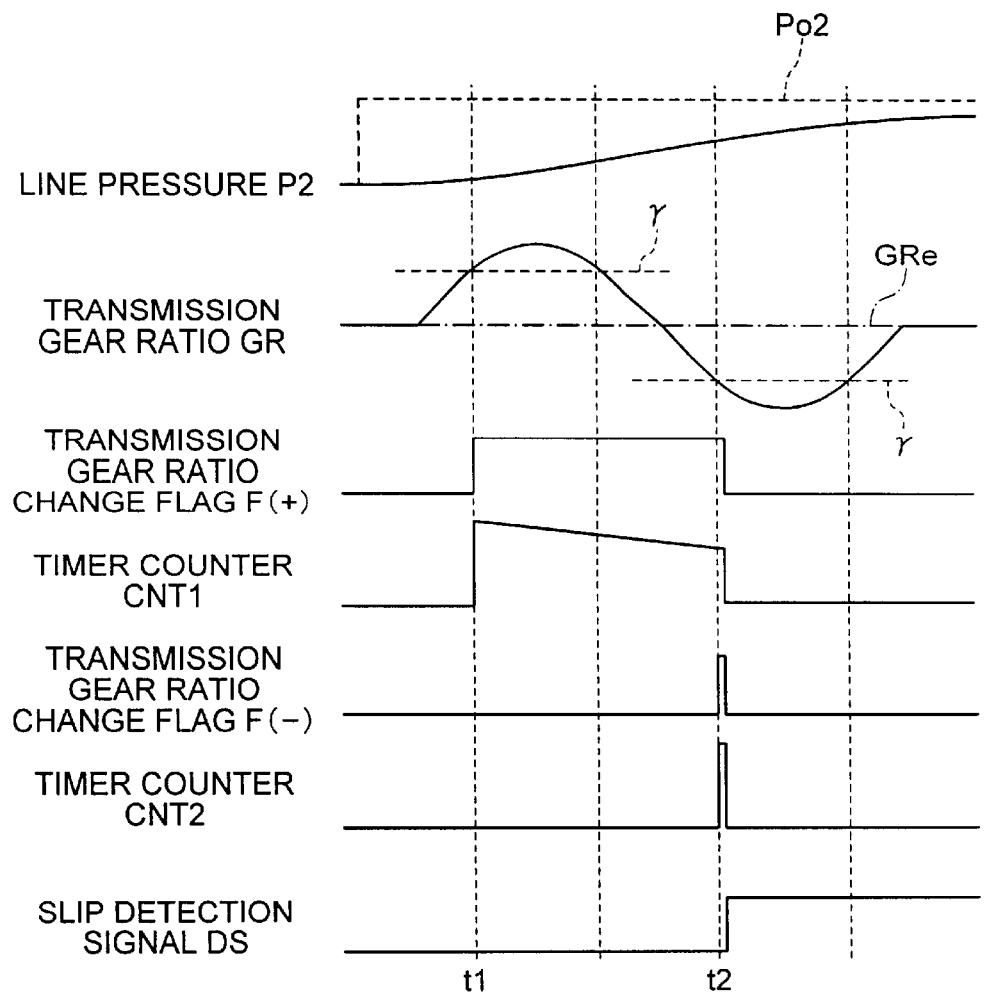
FIG. 2 is a timing chart illustrating a slip detection operation according to the embodiment 1 of the present invention.
Figure 3:
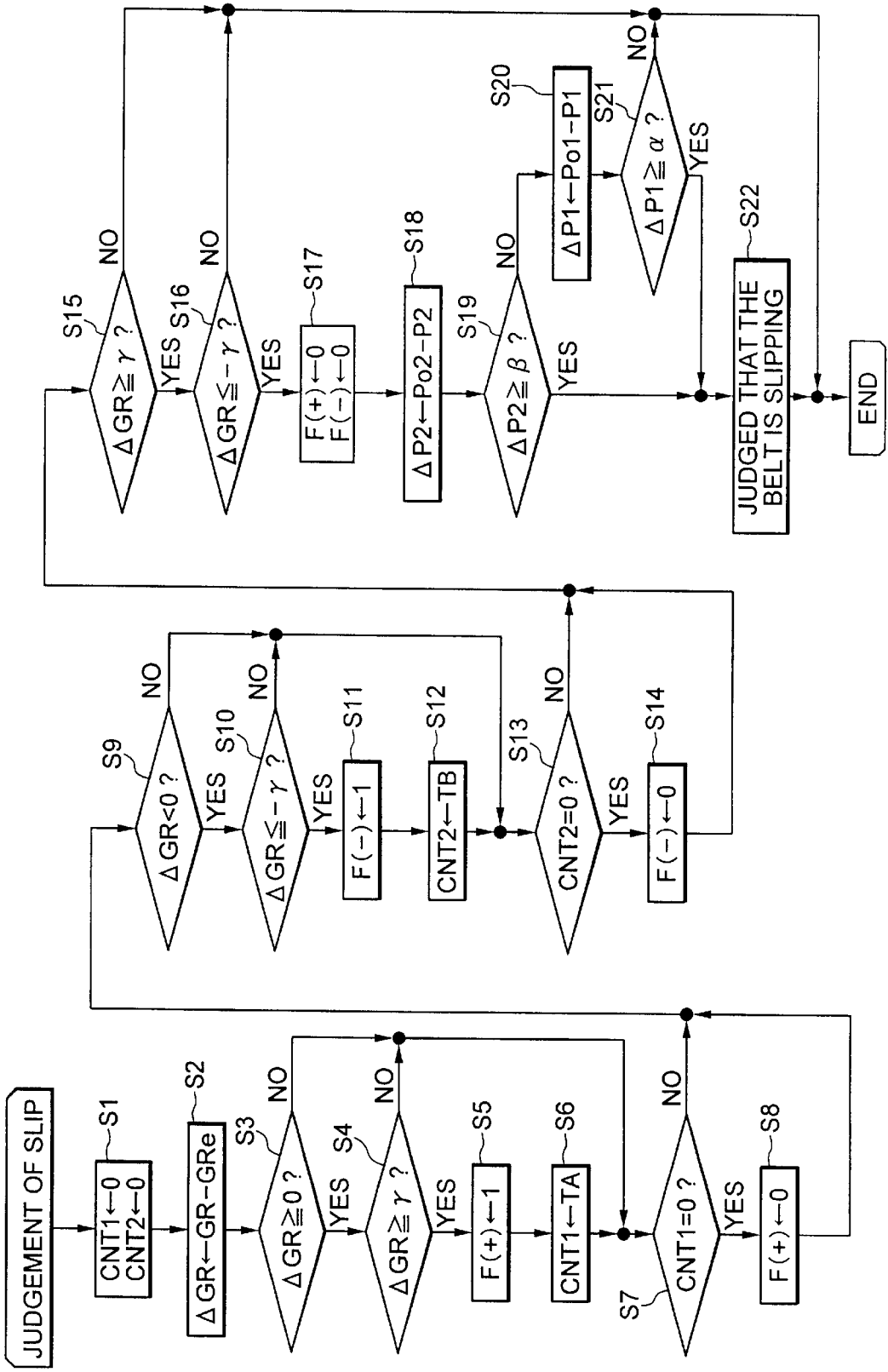
FIG. 3 is a flowchart illustrating a slip judging operation according to the embodiment 1 of the present invention.

FIG. 2 is a timing chart illustrating a slip detection operation according to the embodiment 1 of the invention, and FIG. 3 is a flowchart illustrating a slip judging operation according to the embodiment 1 of the invention.

Figure 8:
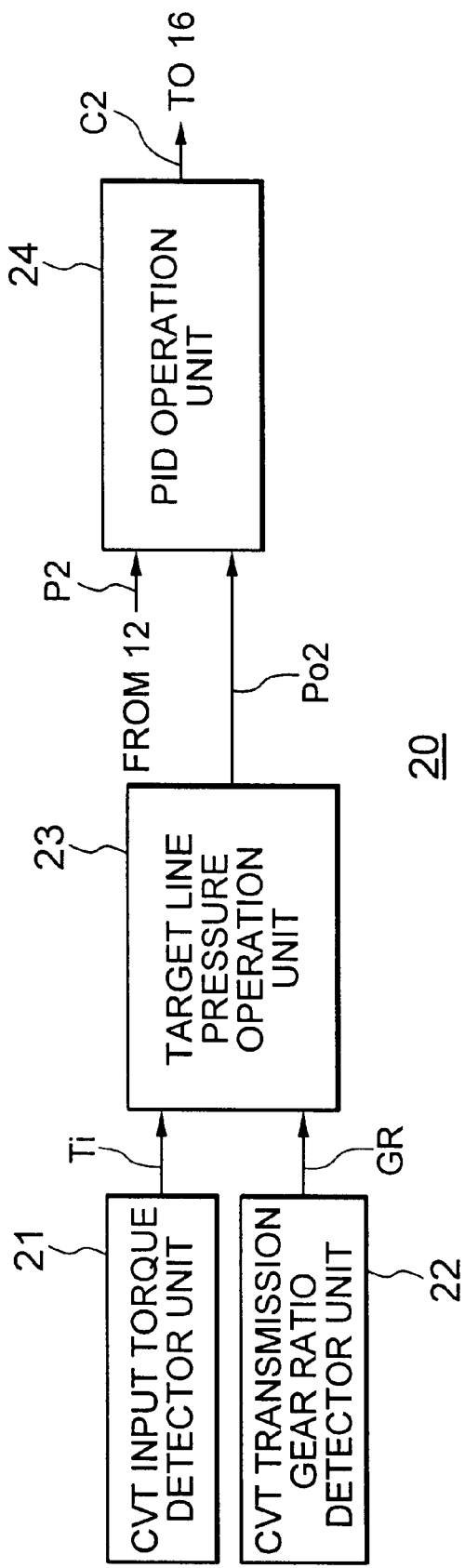
FIG. 8 is a functional block diagram illustrating the constitution of a controller in the conventional device for hydraulically controlling the continuously variable transmission.

In FIG. 1, the controller 20A includes an adder 25, a correction amount operation unit 26, a belt slip detector unit 27, a virtual transmission gear ratio operation unit 28 and a switch SW1 in addition to the CVT input torque detector unit 21, CVT transmission gear ratio detector unit 22, target line pressure operation unit 23 and PID operation unit 24 described above (see FIG. 8).

The schematic constitution according to the embodiment 1 of the present invention is as described above (see FIG. 7), but the function is different in a portion of the controller 20A.

Though there is shown only a unit for operating the control amount C2 in relation to the line pressure P2, the controller 20A includes a target primary pressure operation unit (not shown) for operating, as a target primary pressure Po1, the primary pressure (first hydraulic pressure) necessary for clamping the V-belt $5c$ to the first and second pulleys $5a$ and $5b$.

The virtual transmission gear ratio operation unit 28 in the controller 20A subjects the real transmission gear ratio GR detected by the CVT transmission gear ratio detector unit 22 to the primary delay filtering to operate a virtual transmission gear ratio GRe.

Here, the filter constant used for the primary delay processing in the virtual transmission gear ratio operation unit 28 is set to a value which is large enough so will not to change following the change in the transmission gear ratio GR when the V-belt $5c$ slips.

The belt slip detector unit 27 forms a slip detection signal DS when the slipping state of the V-belt $5c$ is detected based on the comparison of the transmission gear ratio GR with the virtual transmission gear ratio GRe.

For example, as will be described later, the belt slip detector unit 27 forms a slip detection signal DS when a difference $\Delta$ GR in the transmission gear ratio between the transmission gear ratio GR and the virtual transmission gear ratio GRe becomes larger than a second predetermined amount (not larger than $-\gamma$) in the direction of a second polarity (e.g., negative direction) opposite to the direction of a first polarity (e.g., positive direction) within a predetermined period of time TA from when a value larger than a first predetermined amount (threshold value $\gamma$) is exhibited in the direction of the first polarity.

Here, the first and second predetermined amounts (threshold values $\gamma$, $-\gamma$) have been set to be larger than a difference in the transmission gear ratio that occurs when normally changing the speed.

Further, the predetermined period of time TA is set to be shorter than a time from when a difference ΔGR in the transmission gear ratio larger than the first predetermined amount has occurred by normally changing the speed until when a difference Δ GR in the transmission gear ratio larger than the second predetermined amount occurs.

As will be described later, further, the belt slip detector unit 27 validates the processing for detecting the slipping state when a difference Δ P2 in the line pressure between the target line pressure Po2 and the line pressure P2 (second real hydraulic pressure) becomes greater than a predetermined amount β.

The belt slip detector unit 27 validates the detection of slipping state when a difference ΔP1 in the primary pressure between the target primary pressure Po1 and the primary pressure P1 (first real hydraulic pressure) really detected becomes greater than a predetermined amount α.

The correction amount operation unit 26 forms a correction amount PC2 for correcting the target line pressure Po2 at the time of forming the slip detection signal DS.

The switch SW1 is inserted between the correction amount operation unit 26 and the adder 25, is normally turned off (opened), and is turned on (closed) in response to the slip detection signal DS of the on level to input the correction amount PC2 to the adder 25.

The adder 25 is inserted between the target line pressure operation unit 23 and the PID operation unit 24, adds the correction amount PC2 input through the switch SW1 to the target line pressure Po2 at the time when the slip detection signal DS is formed, and inputs the finally corrected target line pressure PoC2 to the PID operation unit 24.

That is, when the belt slip detector unit 27 has detected the slipping state of the V-belt 5c, the adder 25 adds the correction amount PC2 found by the correction amount operation unit 26 to the target line pressure Po2.

The adder 25, correction amount operation unit 26 and switch SW1 constitute a belt slip suppressing unit that executes the correction processing for suppressing the slip of the V-belt 5c in response to the slip detection signal DS.

Figure 7:
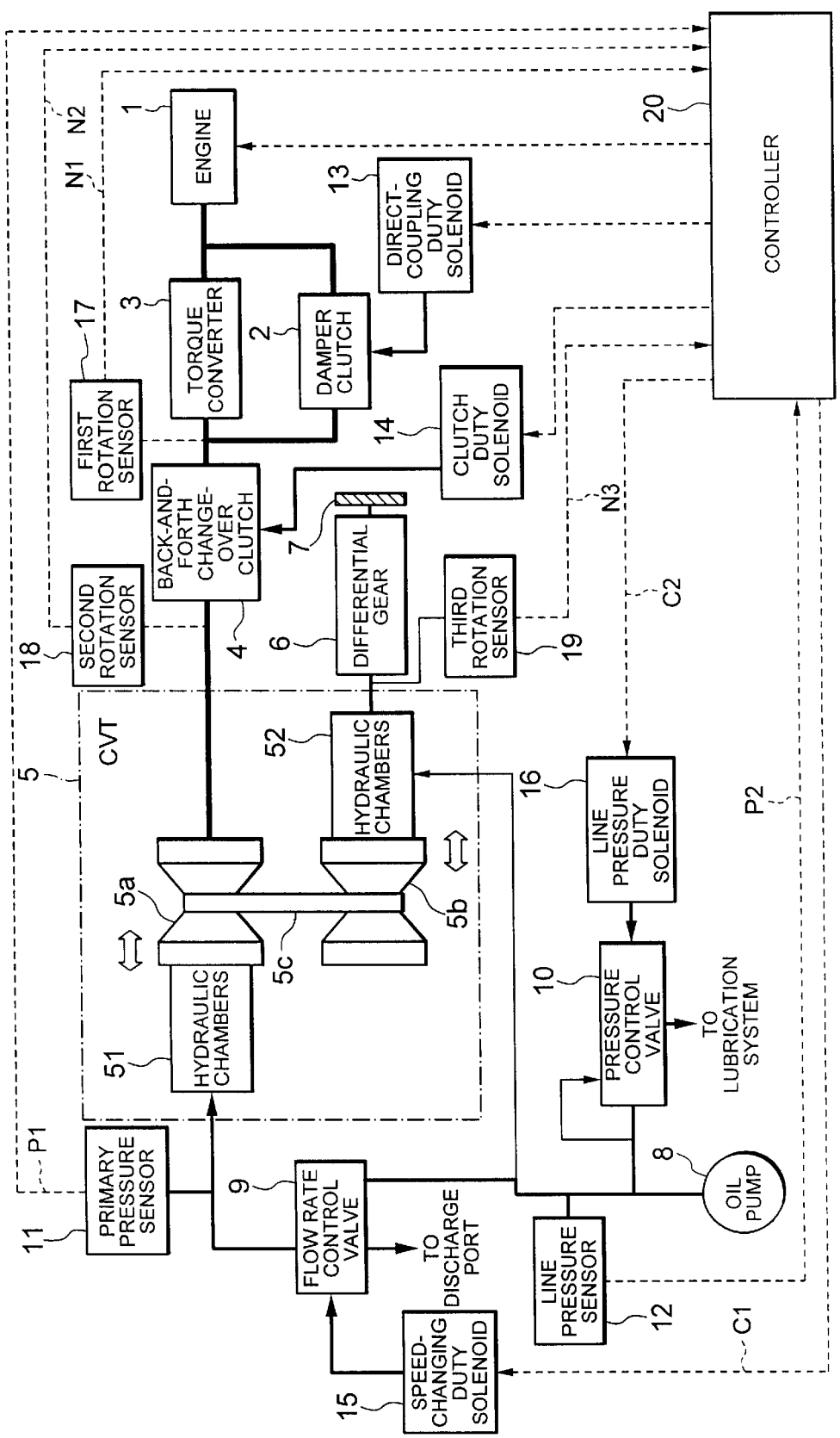
FIG. 7 is a view schematically illustrating the constitution of a device for hydraulically controlling a general continuously variable transmission of the V-belt type.

Next, the operation of the belt slip detector unit 27 according to the embodiment 1 of the invention shown in FIG. 1 will be described with reference to FIG. 7 as well as FIGS. 2 and 3.

In FIG. 2, the line pressure P2 approaches the target line pressure Po2 with the passage of time.

A transmission gear ratio change flag F(+) is set to "1" when a difference between the transmission gear ratio GR and the virtual transmission gear ratio GRe assumes a positive value and becomes greater than a predetermined threshold value γ.

A transmission gear ratio change flag F(−) is set to "1" when a difference between the transmission gear ratio GR and the virtual transmission gear ratio GRe assumes a negative value and becomes smaller than a predetermined threshold value −γ.

The timer counters CNT1 and CNT2 start counting down the transmission gear ratio change flags F(+) and F(−) for a predetermined period of time from a moment when they were set.

The slip detection signal DS assumes "1" (on level) when one of the transmission gear ratio flags F(+) and F(−) is set before the passage of a predetermined period of time from when the other one was set.

In FIG. 2, the slip is detected when a difference Δ GR in the transmission gear ratio has changed up to the negative threshold value −γ within a predetermined period of time TA after having exceeded the positive threshold value γ. Conversely, however, it needs not be pointed that the slip can be also detected when the difference L GR in the transmission gear ratio has changed up to the positive threshold value γ within the predetermined period of time TB after having exceeded the negative threshold value −γ.

In FIG. 3 (routine for judging the slip of V-belt 5c), the controller 20A, first, clears the timer counters CNT1 and CNT2 to zero (step S1).

Then, the CVT transmission gear ratio operation unit 22 finds a real transmission gear ratio GR of the CVT 5 from the second and third rotational speeds N2 and N3 (input and output rotational speeds of the CVT 5).

The virtual transmission gear ratio operation unit 28 subjects the transmission gear ratio GR to the primary delay filtering to find a virtual transmission gear ratio GRe.

Next, the belt slip detector unit 27 executes the following processing steps S2 to S22 to detect the slipping state of the V-belt 5c.

First, a difference Δ GR (=GR−GRe) in the transmission gear ratio between the transmission gear ratio GR and the virtual transmission gear ratio GRe is found (step S2), and it is judged whether the difference Δ GR in the transmission gear ratio is greater than 0 (step S3).

When it is judged at step S3 that ΔGR<0 (i.e., No), the routine readily proceeds to step S7. When it is judged at step S3 that ΔGR≧0 (i.e., Yes), it is then judged whether the difference Δ GR in the transmission gear ratio is greater than the threshold value γ (step S).

When it is judged at step S4 that ΔGR<γ (i.e., No), the routine readily proceeds to step S7. When it is judged at step S4 that Δ GR≧γ (i.e., Yes), the transmission gear ratio change flag F(+) in the positive direction is set to "1" (step S5).

Further, a value corresponding to a predetermined period of time TA is set to the timer counter CNT1 (step S6) to execute a known down-count processing, and it is judged whether the timer counter CNT1 is decreased to zero (step S7).

In FIG. 2, the transmission gear ratio change flag F(+) is set to "1" at a moment t1 when the difference A GR in the transmission gear ratio becomes greater than the threshold value γ, and the timer counter CNT1 starts counting down after the passage of the predetermined period of time TA.

When it is judged at step S7 in FIG. 3 that CNT1=0 (i.e., Yes), it means that the predetermined period of time TA has passed after the transmission gear ratio change flag (+) is set. Therefore, the transmission gear ratio change flag F(+) is cleared to zero (step S8) and the routine proceeds to step S9.

When it is judged at step S7 that CNT>0 (i.e., No), the predetermined period of time TA is not still passing from when the transmission gear ratio change flag F(+) is set, and the routine readily proceeds to step S9.

Thus, when the difference ΔGR in the transmission gear ratio is not smaller than the positive threshold value γ, the transmission gear ratio change flag F(+) is set to initially set the predetermined period of time TA to the timer counter CNT1. The timer counter CNT1 is decreased after every period of operation, and the transmission gear ratio change flag F(+) is cleared at a moment when CNT1=0.

At step S9, it is judged whether the difference A GR in the transmission gear ratio is of a negative value.

When it is judged at step S9 that ΔGR≧0 (i.e., No), the routine readily proceeds to step S13. When it is judged at step S9 that ΔGR<0 (i.e., Yes), then, it is judged whether the difference ΔGR in the transmission gear ratio is smaller than the negative threshold value −γ (step S10).

When it is judged at step S10 that Δ GR>−γ (i.e., No), the routine readily proceeds to step S13. When it is judged at step S10 that Δ GR<−γ (i.e., Yes), the transmission gear ratio change flag F(−) in the negative direction is set to "1" (step S11).

Further, a value corresponding to the predetermined period of time TB is set to the timer counter CNT2 (step S12) to execute a known down-count processing, and it is judged whether the timer counter CNT2 is decreased to 0 (step S13).

In FIG. 2, the transmission gear ratio change flag F(−) is set to "1" at time t2 at which the difference A GR in the transmission gear ratio becomes smaller than the negative threshold value γ before the passage of the predetermined period of time TA from the time t1 when the transmission gear ratio change flag F(+) was set.

In FIG. 2, the condition for detecting the slip of the V-belt 5c is simplified, the timer counter CNT2 does not start down-counting after the passage of the predetermined period of time TB, and the slip detection signal DS is formed right after the time t2.

When it is judged at step S13 in FIG. 3 that CNT2=0 (i.e., Yes), it means that the predetermined period of time TB has passed after the transmission gear ratio change flag F(−) was set, whereby the transmission gear ratio change flag F( ) is cleared to 0 (step S14), and the routine proceeds to step S15.

When it is judged at step S13 that CNT2>0 (i.e., No), the predetermined period of time TB has not yet passed from when the transmission gear ratio change flag F(−) was set, and the routine readily proceeds to step S15.

Thus, when the difference ΔGR in the transmission gear ratio is smaller than the negative threshold value −γ, the transmission gear ratio change flag F(−) is set to initially set the predetermined period of time TB to the timer counter CNT2. The timer counter CNT2 is decreased after every period of operation, and the transmission gear ratio change flag F( ) is cleared when CNT2=0.

For example, when the difference Δ GR in the transmission gear ratio changes to become smaller than the threshold value −γ from a state of larger than the threshold value γ within the predetermined period of time TA, it is probable that the V-belt 5c is slipping rather than the change in the transmission gear ratio GR under ordinary operation condition. Therefore, the state is maintained in which the transmission gear ratio change flags F(+) and F(−) are set.

At step S15, it is judged whether difference ΔGR in the transmission gear ratio is greater than the threshold value γ.

When it is judged at step S15 that ΔGR<0 (i.e., No), the processing routine of FIG. 3 readily ends. When it is judged that ΔGR>0 (i.e., Yes), it is then judged whether the difference Δ GR in the transmission gear ratio is smaller than the negative threshold value −γ (step S16).

When it is judged at step S16 that Δ GR>−γ (i.e., No), the processing routine of FIG. 3 readily ends. When it is judged at step S16 that Δ GR<−γ (i.e., Yes), the state (=1) where the positive and negative transmission gear ratio change flags F(+) and F(−) are set is read out, and the flags are cleared to 0 for the judging processing in the next time (step S17).

Further, a difference ΔP2 (=Po2−P2) in the line pressure between the target line pressure Po2 and the real line pressure P2 is found (step S18), and it is judged whether the difference ΔP2 in the line pressure is greater than the predetermined threshold value β (step S19).

When it is judged at step S19 that ΔP2<β (i.e., No), then, a difference ΔP1 (=Po1−P1) in the primary pressure between the target primary pressure o1 and the real primary pressure P1 is found (step S20), and it is judged whether the difference Δ P1 in the primary pressure is greater than the predetermined threshold value a (step S21).

When it is judged at step S21 that ΔP1<α (i.e., No), the processing routine of FIG. 3 readily ends. When it is judged that Δ P1≧α (i.e., Yes), it is judged that the V-belt 5c is slipping, whereby the slip detection signal DS is turned on (step S22) to end the processing routine of FIG. 3.

On the other hand, when it is judged at step S19 that ΔP2≧β (i.e., Yes), the routine readily proceeds to step S22 where the slip detection signal DS is turned on to end the processing routine of FIG. 3.

When the difference ΔP1 in the primary pressure is greater than the threshold value α or when the difference ΔP2 in the line pressure is greater than the threshold value β through the steps S18 to S22, the belt slip detector unit 27 works to finally judge the slipping state of the V-belt 5c.

Thus, when the transmission gear ratio change judging flags F(+) and F(−) are both set to "1" in a state where the real primary pressure P1 is smaller than the target value Po1 or in a state where the real line pressure P2 is smaller than the target value Po2, the belt slip detector unit 27 so judges that the V-belt 5c is slipping and produces a slip detection signal DS of the on-level.

Then, the switch SW1 is turned on, and the adder 25 adds a predetermined correction amount PC2 to the target line pressure Po2 and inputs the corrected target line pressure PoC2 to the PID operation unit 24.

When the slipping state of the V-belt 5c is detected, therefore, the PID operation unit 24 produces a control amount C2 corresponding to the corrected target line pressure PoC2 and corrects the line pressure P2 toward the high hydraulic pressure side to suppress the slip of the V-belt 5c.

Based on the detected values such as input and output rotational speeds N2, N3 of the CVT 5, transmission gear ratio GR, input torque Ti, primary pressure P1 and line pressure P2, as described above, the primary pressure and the line pressure are adjusted to the target values Po1 and Po2, and the slipping state of the V-belt 5c is detected.

Here, it is judged that the slip is occurring when the belt slip detector unit 27 has detected a state in which a difference ΔGR in the transmission gear ratio between the transmission gear ratio GR and a virtual transmission gear ratio GRe obtained by filtering the transmission gear ratio GR has decreased to be smaller than a predetermined amount −γ within a predetermined period of time TA from a moment t1 when the difference A GR has exceeded the predetermined amount γ. It is therefore allowed to easily and correctly detect the slipping state. Besides, the state of normally changing the speed is reliably prevented from being erroneously detected as slipping.

Further, the correction processing for suppressing the slip is executed only when the slip is detected, and the predetermined amount PC2 is added to the target line pressure Po2 to form the corrected target line pressure PoC2. Thus, the line pressure P2 is set to a required minimum value until the slipping state is detected, whereby the engine load is decreased and the fuel efficiency is improved.

Embodiment 2.

In the above-mentioned embodiment, the correction amount operation unit 26 produces a predetermined correction amount PC2 in response to the slip detection signal DS. However, there may be produced a correction amount PC2 that increases by a predetermined amount every time when the slip detection signal DS is formed repetitively.

Figure 4:
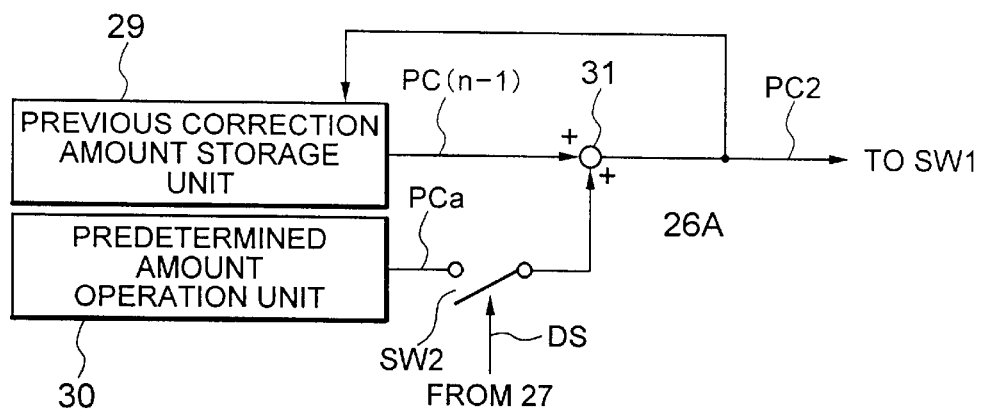
FIG. 4 is a functional block diagram illustrating a correction amount operation unit according to an embodiment 2 of the present invention.
Figure 5:
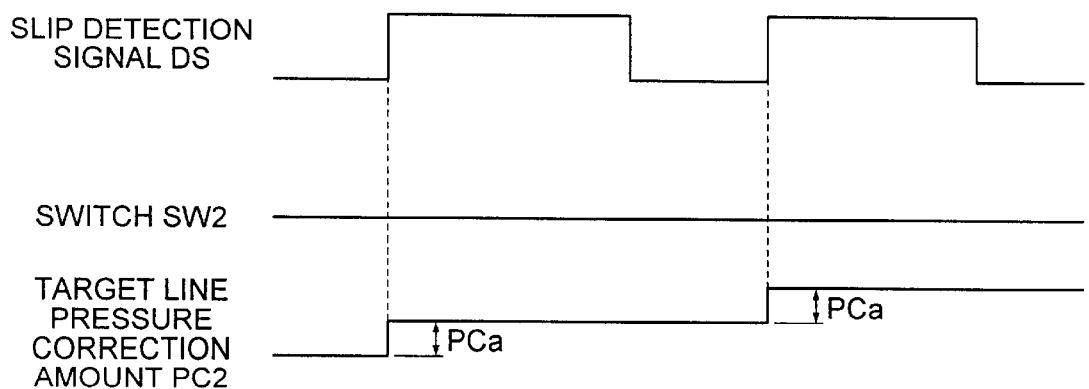
FIG. 5 is a timing chart illustrating an operation for increasing the correction amount according to the embodiment 2 of the present invention.

FIG. 4 is a functional block diagram illustrating the correction amount operation unit 26A according to an embodiment 2 of the invention, which increases the correction amount PC2 every time when the slip detection signal DS is formed, and FIG. 5 is a timing chart illustrating the operation for increasing the correction amount PC2 according to the embodiment 2 of the invention.

In FIG. 4, the correction amount operation unit 26A includes a previous correction amount storage unit 29 for storing the correction amount PC(n−1) of the previous time, a predetermined amount operation unit 30 for operating a predetermined amount PCa, a switch SW2 which is turned on (closed) in response to the slip detection signal DS, and an adder 31 which adds the predetermined amount PCa to the correction amount PC(n−1) of the previous time.

The previous correction amount storage unit 29 updates and stores the correction amount PC2 of this time as the correction amount PC(n−1) of the previous time every time when the correction amount PC2 is operated.

The switch SW2 is inserted between the predetermined amount operation unit 30 and the adder 31, is normally turned off (opened) and is turned on (closed) in response to a slip detection signal DS of the on-level to input the predetermined amount PCa to the adder 31.

The adder 31 is inserted between the previous correction amount storage unit 29 and the output terminal of the correction amount operation unit 26A, and inputs a value obtained by adding a predetermined amount PCa to the correction amount Pc(n−1) of the previous time, as a correction amount PC2, to the switch SW1.

As shown in FIG. 5, therefore, the switch SW2 is turned on from the off state every time when the slip detection signal DS is turned on being triggered by the on timing of the slip detection signal DS, and predetermined amount PCa is cumulatively added to the correction amount PC2.

When the slipping state of the V-belt 5c is repetitively detected, therefore, the correction amount PC2 is increased, whereby the slipping state of the V-belt 5 is quickly suppressed even in an excessively slipping state.

Embodiment 3.

In the above-mentioned embodiment 1, the line pressure P2 is increased to suppress the slip when the slip is detected. The slip, however, may be suppressed by decreasing the torque Ti input to the CVT 5.

Figure 6:
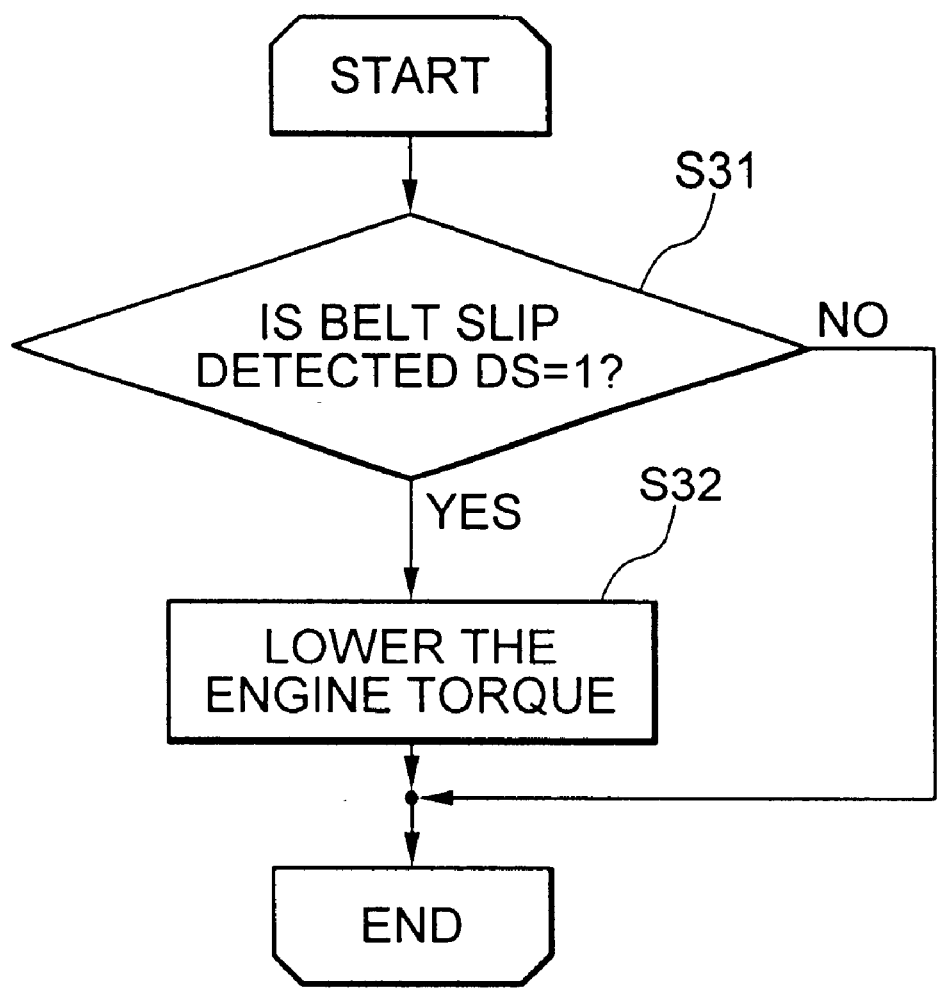
FIG. 6 is a flowchart illustrating a slip suppressing operation according to an embodiment 3 of the present invention.

FIG. 6 is a flow chart illustrating the operation for suppressing the slip according to an embodiment 3 of the invention, in which the engine torque is decreased when the slip is detected.

The functional constitution of the controller 20A and the schematic constitution of the whole device according to the embodiment 3 of the invention are the same as those described earlier (see FIGS. 1 and 7).

In this case, the belt slip suppressing unit in the controller 20A includes an output torque control unit for controlling the output torque of the engine, and decreases the output torque of the engine 1 in response to the slip detection signal DS.

In FIG. 6, the belt slip suppressing unit, first, judges whether the slip detection signal DS is of the "1 (on)" level (belt slip-detecting state) (step S31). When it is judged that DS=0 (i.e., No), the processing routine of FIG. 6 ends.

On the other hand, when it is judged at step S31 that DS=1 (i.e., Yes), the output torque of the engine 1 is decreased to decrease the torque Ti input to the CVT 5 (step S32), and the processing routine of FIG. 6 ends.

Thus, the torque Ti input to the CVT 5 is suppressed when the slip is detected, whereby the transmission torque of the V-belt 5c is decreased to suppress the slip.

Embodiment 4.

In the above-mentioned embodiment 1, the judging function of the belt slip detector unit 27 is validated through steps S18 to S22 (see FIG. 3) only when the difference ΔP1 in the primary pressure and the difference ΔP2 in the line pressure are not smaller than the threshold values α and β to reliably prevent the erroneous detection of the slipping state. When the erroneous detection is little probable, however, the slip may be detected through steps S2 to S14 only (see FIG. 2) while omitting steps S18 and S19.

Further, the above-mentioned embodiment 1 may be combined with the processing for decreasing the torque of the embodiment 3. In this case, a further increased effect is exhibited for suppressing the slip.

What is claimed is:

1. A device for hydraulically controlling a continuously variable transmission comprising:

a continuously variable transmission of the V-belt type connected to the output side of an engine;

rotation sensors for detecting the input and output rotational speeds of said continuously variable transmission;

hydraulic pressure sensors for detecting first and second real hydraulic pressures for the first and second pulleys in said continuously variable transmission; and a controller that receives operation conditions of said engine, the input and output rotational speeds of said continuously variable transmission, and the first and second real hydraulic pressures of the first and second pulleys in said continuously variable transmission, and adjusts the hydraulic pressures of said first and second pulleys; wherein said controller comprises:
a belt slip detector unit which forms a slip detection signal when a slipping state of said V-belt is detected; and
a belt slip suppressing unit which executes a correction processing for suppressing the slip of the V-belt in response to said slip detection signal,
wherein said controller further comprises:
a real transmission gear ratio operation unit for operating upon a real transmission gear ratio of said continuously variable transmission based upon said input and output rotational speeds; and
a virtual transmission gear ratio operation unit for operating upon a virtual transmission gear ratio of said continuously variable transmission based upon said real transmission gear ratio;
wherein said belt slip detector unit forms said slip detection signal based upon the comparison of said real transmission gear ratio with said virtual transmission gear ratio;
wherein said belt slip detector unit forms said slip detection signal when a difference in the transmission gear ratio between said real transmission gear ratio and said virtual transmission gear ratio, becomes larger than a second predetermined amount in the direction of a second polarity opposite to the direction of a first polarity within a predetermined period of time from a moment when the difference in the transmission gears ratio became larger than a first predetermined amount in the direction of the first polarity.

2. A device for hydraulically controlling a continuously variable transmission according to claim 1, wherein said first and second predetermined amounts are set to be larger than a difference in the transmission gear ratio that occurs when normally changing the speed, and said predetermined period of time is set to be shorter than a time from when a difference in the transmission gear ratio becomes larger than said first predetermined amount while normally changing the speed until when a difference in the transmission gear ratio becomes larger than said second predetermined amount.

3. A device for hydraulically controlling a continuously variable transmission comprising:
   a continuously variable transmission of the V-belt type connected to the output side of an engine;
   rotation sensors for detecting the input and output rotational speeds of said continuously variable transmission;
   hydraulic pressure sensors for detecting first and second real hydraulic pressures for the first and second pulleys in said continuously variable transmission; and
   a controller that receives operation conditions of said engine, the input and output rotational speeds of said continuously variable transmission, and the first and second real hydraulic pressures of the first and second pulleys in said continuously variable transmission, and adjusts the hydraulic pressures of said first and second pulleys; wherein
   said controller comprises:
      a belt slip detector unit which forms a slip detection signal when a slipping state of said V-belt is detected; and
      a belt slip suppressing unit which executes a correction processing for suppressing the slip of the V-belt in response to said slip detection signal,
      wherein said controller further comprises:
         a real transmission gear ratio operation unit for operating upon a real transmission gear ratio of said continuously variable transmission based upon said input and output rotational speeds; and
         a virtual transmission gear ratio operation unit for operating upon a virtual transmission gear ratio of said continuously variable transmission based upon said real transmission gear ratio;
         wherein said belt slip detector unit forms said slip detection signal based upon the comparison of said real transmission gear ratio with said virtual transmission gear ratio;
         wherein said virtual transmission gear ratio operation unit operates said virtual transmission gear ratio by subjecting said real transmission gear ratio to a primary delay filtering, and a filter constant used in said primary delay filtering is set to a value that does not change following the change in said real transmission gear ratio when said slip has occurred.

4. A device for hydraulically controlling a continuously variable transmission comprising:
   a continuously variable transmission of the V-belt type connected to the output side of an engine;
   rotation sensors for detecting the input and output rotational speeds of said continuously variable transmission;
   hydraulic pressure sensors for detecting first and second real hydraulic pressures for the first and second pulleys in said continuously variable transmission; and
   a controller that receives operation conditions of said engine, the input and output rotational speeds of said continuously variable transmission, and the first and second real hydraulic pressures of the first and second pulleys in said continuously variable transmission, and adjusts the hydraulic pressures of said first and second pulleys; wherein
   said controller comprises:
      a belt slip detector unit which forms a slip detection signal when a slipping state of said V-belt is detected; and
      a belt slip suppressing unit which executes a correction processing for suppressing the slip of the V-belt in response to said slip detection signal,
      wherein said controller includes a target line pressure operation unit that operates, as a target line pressure, the second hydraulic pressure necessary for clamping said V-belt to said first and second pulleys, and said belt slip detector unit validates the processing for detecting said slipping state when a difference in the line pressure between said target line pressure and said second real hydraulic pressure is greater than a predetermined amount.

5. A device for hydraulically controlling a continuously variable transmission comprising:
   a continuously variable transmission of the V-belt type connected to the output side of an engine;
   rotation sensors for detecting the input and output rotational speeds of said continuously variable transmission;
   hydraulic pressure sensors for detecting first and second real hydraulic pressures for the first and second pulleys in said continuously variable transmission; and
   a controller that receives operation conditions of said engine, the input and output rotational speeds of said continuously variable transmission, and the first and second real hydraulic pressures of the first and second pulleys in said continuously variable transmission, and adjusts the hydraulic pressures of said first and second pulleys; wherein
   said controller comprises:
      a belt slip detector unit which forms a slip detection signal when a slipping state of said V-belt is detected; and
      a belt slip suppressing unit which executes a correction processing for suppressing the slip of the V-belt in response to said slip detection signal,
      wherein said controller includes a target primary pressure operation unit for operating, as a target primary pressure, the first hydraulic pressure necessary for clamping said V-belt to said first and second pulleys, and said belt slip detector unit validates the processing for detecting said slipping state when a difference in the line pressure between said target line pressure and said first real hydraulic pressure is greater than a predetermined amount.

6. A device for hydraulically controlling a continuously variable transmission comprising:
   a continuously variable transmission of the V-belt type connected to the output side of an engine;
   rotation sensors for detecting the input and output rotational speeds of said continuously variable transmission;
   hydraulic pressure sensors for detecting first and second real hydraulic pressures for the first and second pulleys in said continuously variable transmission; and
   a controller that receives operation conditions of said engine, the input and output rotational speeds of said continuously variable transmission, and the first and second real hydraulic pressures of the first and second pulleys in said continuously variable transmission, and adjusts the hydraulic pressures of said first and second pulleys; wherein said controller comprises:
- a belt slip detector unit which forms a slip detection signal when a slipping state of said V-belt is detected; and
- a belt slip suppressing unit which executes a correction processing for suppressing the slip of the V-belt in response to said slip detection signal,
- wherein said belt slip suppressing unit adds a predetermined correction amount target line pressure in response to said slip detection signal.

7. A device for hydraulically controlling a continuously variable transmission according to claim 6, wherein said belt slip suppressing unit increases said correction amount by a predetermined amount every time when said slip detection signal is formed repetitively.

8. A device for hydraulically controlling a continuously variable transmission comprising:
- a continuously variable transmission of the V-belt type connected to the output side of an engine;
- rotation sensors for detecting the input and output rotational speeds of said continuously variable transmission;
- hydraulic pressure sensors for detecting first and second real hydraulic pressures for the first and second pulleys in said continuously variable transmission; and
- a controller that receives operation conditions of said engine, the input and output rotational speeds of said continuously variable transmission, and the first and second real hydraulic pressures of the first and second pulleys in said continuously variable transmission, and adjusts the hydraulic pressures of said first and second pulleys; wherein said controller comprises:
- a belt slip detector unit which forms a slip detection signal when a slipping state of said V-belt is detected; and
- a belt slip suppressing unit which executes a correction processing for suppressing the slip of the V-belt in response to said slip detection signal,
- wherein said controller includes an output torque control unit for controlling the output torque of said engine, and said belt slip suppressing unit decreases the output torque of said engine in response to said slip signal.

* * * * *